United States Patent
Terauchi et al.

[11] Patent Number: 5,217,729
[45] Date of Patent: Jun. 8, 1993

[54] MOLD FOR PLASTIC BOTTLES

[75] Inventors: Yusuke Terauchi; Toshiaki Kakemura; Chiaki Takasaki; Tatsuo Furuse, all of Tokyo, Japan

[73] Assignee: Toppan Printing Co., Ltd., Tokyo, Japan

[21] Appl. No.: 672,669

[22] Filed: Mar. 21, 1991

[30] Foreign Application Priority Data

| Mar. 22, 1990 | [JP] | Japan | 2-74228 |
| Mar. 22, 1990 | [JP] | Japan | 2-74277 |
| Feb. 5, 1991 | [JP] | Japan | 3-014426 |

[51] Int. Cl.⁵ .................. B29C 33/10; B29C 49/62
[52] U.S. Cl. .................. 425/522; 249/135; 425/812
[58] Field of Search ....... 425/522, 538, 524, DIG. 23, 425/812; 264/39, 526, 539; 65/261, 263; 249/134, 135; 215/1 C

[56] References Cited

U.S. PATENT DOCUMENTS

| 3,597,793 | 8/1971 | Weiler et al. | 425/524 X |
| 4,034,036 | 7/1977 | Farrell | 425/522 X |
| 4,120,924 | 10/1978 | Rainville | 425/522 X |
| 4,304,826 | 12/1981 | Kendall et al. | 264/526 X |
| 4,353,964 | 10/1982 | Grimm et al. | 264/39 X |
| 4,699,585 | 10/1987 | Giese et al. | 425/522 |
| 4,849,154 | 7/1989 | Masumoto | 264/539 |
| 4,936,893 | 6/1990 | Yamada et al. | 65/261 X |

Primary Examiner—Richard L. Chiesa
Attorney, Agent, or Firm—Browdy and Neimark

[57] ABSTRACT

A mold for plastic bottles is designed to have an internal arithmetic average of roughness height of a cavity-forming wall to be less than 0.25 $\mu$m. The mold has air passages for decompressing air in the cavity and absorbing the air between the wall and a parison expanded by blowing into it. The mold has air suction passages around the mouth portion of the mold and between the main body and the bottom portion of the mold. The surface of the bottle and the molds have so little air stagnated between the mold and the bottle wall that the resulting bottle results in a high gloss.

1 Claim, 8 Drawing Sheets

MOLD FOR PLASTIC BOTTLES

BACKGROUND OF THE INVENTION

1. Field of the Invention

This invention relates to a mold for molding plastic bottles.

2. Description of the Prior Art

Molding plastic bottles has been conventionally carried out such that parison is first supplied into the cavity between two molds facing to each other during opening the molds, and then they are clamped when parison is fully supplied by a predetermined length, next the parison is pressed against the wall with compressed air inside the parison in the molds, and finally they are opened after curing the molding material.

The cavity-forming-wall is formed coarsely with the intention of no remaining of the air between the parison and the wall during blowing compressed air into the parison.

However, in the conventional mold, the outside surface of a molding formed by the blow of compressed air and the expansion of the parison itself produces a pome-like ground or lowness in luster because of the roughness of the wall surface. On the other hand, a smooth surface of the wall for enhancing the luster causes remaining of the air between the parison and the wall at the time of contact of the parison expanded by compressed air with the wall. And accordingly the external surface of the molding produces uneavenness, which materially reduces the value as merchandise.

SUMMARY OF THE INVENTION

An object of the present invention is to lessen the traces of the air stagnation to the minimum and to augment the quality of the outside of a molding.

A mold for plastic bottles according to the present invention, to retain the object, is characterized in that the arithmetical average of roughness height is less than 0.25 μm, of which the cavity-forming-wall molds a mouth portion and a main body whose diameter increases gradually from the mouth to the bottom by the expansion of the parison, and in that there are air suction passages, associated with air suction means for the pressure reduction inside the cavity at the time of the mold clamp, at any places in the wall.

A mold for plastic bottles according to the present invention is characterized in that there is formed a first air suction passage in the mold along the boundary between the mouth portion and the main body of the bottle, and a second air suction passage in the mold along any one line between the main body and the bottom portion, respectively in the mold.

The mold for plastic bottles according to the present invention makes it possible to produce no air-stagnation between the cavity-forming-wall and the parison because of decompression inside the cavity through the suction passage by air suction means at the time of or before supplying compressed air into the parison in the molds, in spite of the contact of the parison against the wall. And accordingly the outside of the molding by blowing can obtain a good gloss and high value as merchandize because the arithmetical average of roughness height of the wall is designed below 0.25 μm.

The mold for plastic bottles according to the present invention makes it possible to absorb the air left on the cavity-forming-wall over the surface of the bottle at the time of blowing air into the parison inside the clamped molds through the first air suction passage formed around the boundary of the mouth portion and the main body of the bottle on the cavity-forming-wall of the mold, and by the second air suction passage formed between the body and the bottom portion. And accordingly, the surface of the molded bottle has a very small number of traces of air stagnation and can produce high quality.

DESCRIPTION OF THE PREFERRED EMBODIMENT

The embodiment of the present invention will be hereinafter described with reference to the accompanying drawings.

Figure 1:
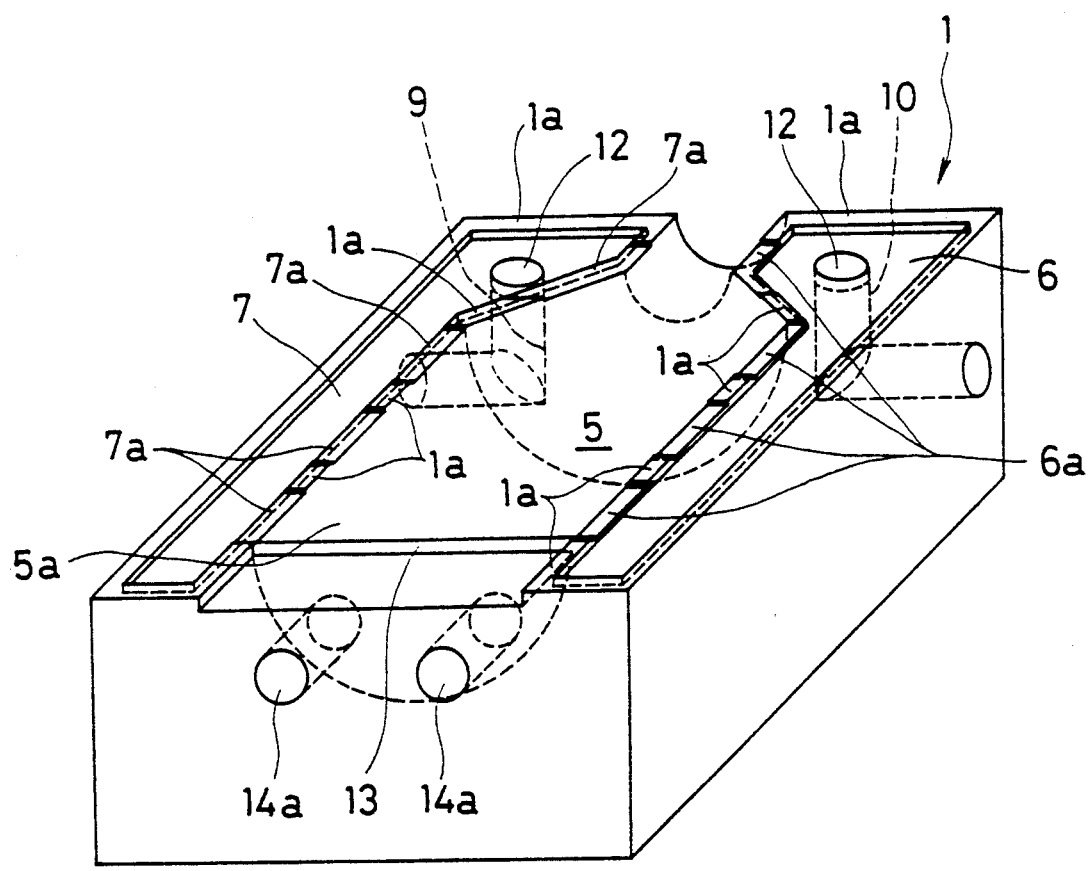
FIG. 1 is a perspective view of a mold according to an embodiment of the present invention.
Figure 4:
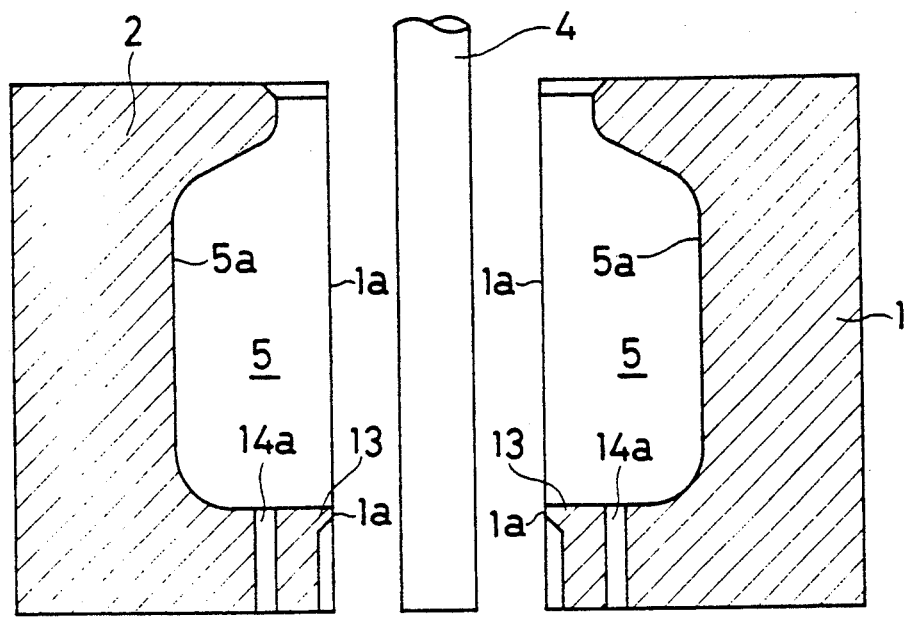
FIG. 4 is an illustration showing process of supplying a parison between opening molds.
Figure 5:
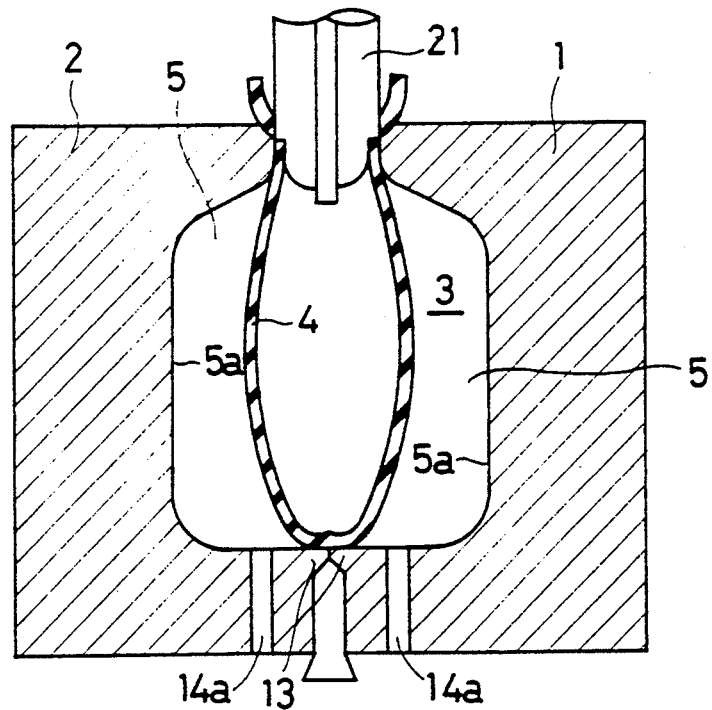
FIG. 5 is an illustration showing a process of blowing air into the parison inside the molds, meanwhile absorbing the air outside the parison.

FIG. 1 is a perspective view of a mold for molding plastic bottles according to the present invention. As shown in FIGS. 4 and 5, a mold 1 makes a cavity 3 by being clamped with a mold 2 paired with the former 1. The mold 1 will be mainly described because its constitution is identical with that of the mold 2. Before the join of the mold 1 together with the mold 2 is supplied parison 4 (see FIGS. 4 through 6), of which a monolayer type or laminated type is used and the outermost layer is resin such as polyethylene, polypropylene, polybutene, polyester, polyacrylonitrile, or polycarbonate.

The molds 1, 2 are made of aluminum and carbon steel, for example. A concave portion 5 for forming a cavity 3 at the time of clamping is constituted under the parting plane 1a for contact of the molds 1 and 2. In this invention, the wall surface of the concave portions 5, 5 of the molds 1 and 2 is designated as a cavity-forming-wall 5a. The arithmetical average of roughness height of the cavity-forming-wall 5a is less than 0.25 μm.

Shallow concave portions for air suction 6 and 7, as shown in FIG. 1, are constituted in the parting plane 1a such as surrounding the concave portion 5. The concave portions 6, 7 constitutes holes for air suction 8, 8 at the time of joining the molds 1, 2. Communicating passages 9, 10 lead to the outside of the mold 1 under the concave portions 6, 7. The passages 9, 10 are connected with air suction means 11 disposed outside the mold 1. Shallow grooves 6a, 7a are constituted between the shallow concave portions for suction 6, 7 and the concave portion 5 for forming the cavity. The grooves 6a, 7a constitute a part of holes 8, 8 for air suction at the time of joining the molds 1, 2. And therethrough the air in the cavity is absorbed by communicating it 3 with the holes for air suction 8, 8 at clamping. The grooves 6a, 7a are as deep as an expanded parison 4 does not intrude upon them 6a, 7a at the time of blowing compressed air into the parison 4.

Figure 2:
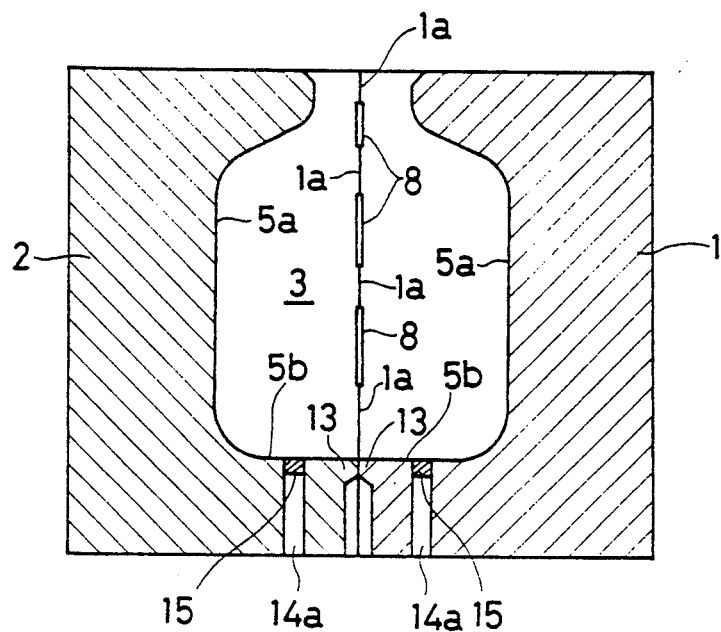
FIG. 2 is an illustration of air suction means connected to the mold for plastic bottles in FIG. 1.

The upper end of the concave portion 5 can hold a parison 4 cut off from an extruder (not shown) and hold a compressed-air-supplying-nozzle 21 inserted into the upper end of the parison 4 on a support of the parison 4. At the lower end of the concave portion 5 is constituted a blade 13 for cutting off the end portion of the parison 4 supplied by the extruder. Through the wall 5b of the lower end of the concave portion 5 are bored holes for air suction 14a, 14a connected with air suction means 11 (described hereinafter). As shown in FIG. 2, at the holes 14a, 14a of the cavity side are pluged flat cocks 15, 15 made of sintered metal, by which the air in the cavity is absorbed.

Figure 3:
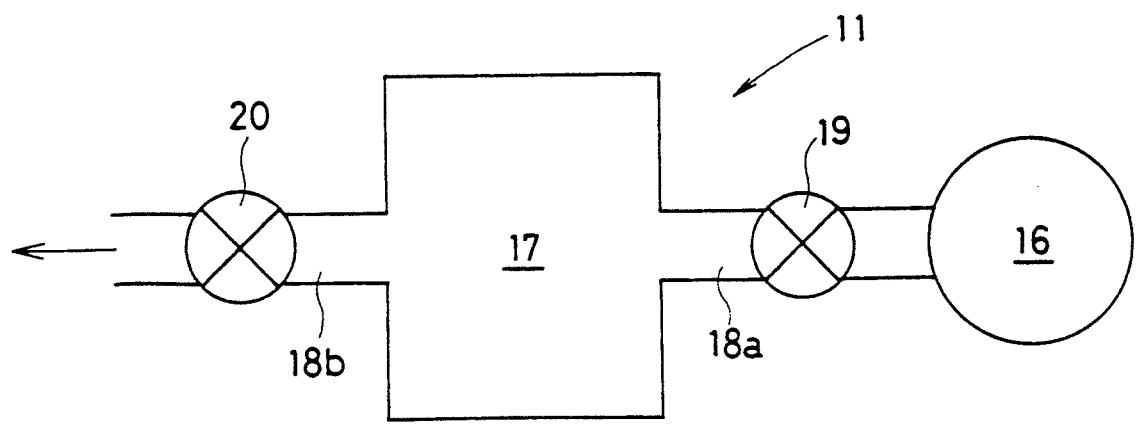
FIG. 3 is an illustration showing the constitution of the air suction means.

As shown in FIG. 3, the air suction means 11 comprises a vacuum pump 16, a chamber for vacuum reservoir 17, pipes 18a, 18b, and valves 19, 20. The vacuum pump 16 is connected with the passages 9, 10 and the air suction passages 14a, 14a through the pipe 18b. The valves 19 and 20 are disposed on the pipes 18a and 18b, respectively. The vacuum pump 16 and the valves 19, 20 are driven by a driving apparatus (not shown).

Figure 6:
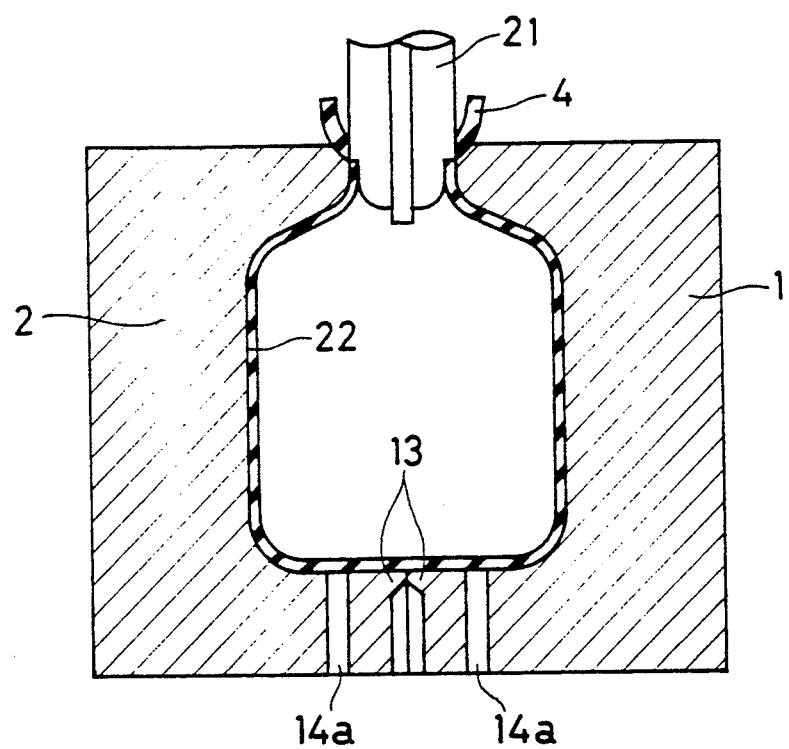
FIG. 6 is an illustration showing a state of the parison filled up fully with air, meanwhile showing a process of vacuum absorption.

Until a parison of a predetermined length is fully supplied, the air pressure in the chamber 17 is being decompressed by the vacuum pump 16 in a state of the opening of the valve 19 and the closure of the valve 20. The air pressure in the chamber 17 is less by 300 Hg than the atomospheric pressure by the vacuum pump 16. In this embodiment, the air in the cavity 3 is absorbed into the chamber 17 in a state of the closure of the valve 19 and the opening of the valve 20 before the nozzle 21 for supplying compressed air is inserted into the parison 4 supported by the molds 1, 2. The air in the cavity is introduced into the chamber 17 by means of the cocks 12, 15 for the air suction holes 8, 8, 14a, 14b, and accordingly the air in the cavity 3 is decompressed. After the air in the cavity 3 is decompressed, the valve 20 is closed and the valve 19 is opened, and the vacuum pump 16 is driven, and then the air in the chamber 17 is again decompressed. On the other hand, the compressed air is supplied through the nozzle 21 under the decompressed state in the cavity 3, and then a molding 22, as shown in FIG. 6, is formed by the contact of the expanded parison 4 against the cavity-forming-wall 5a.

FIGS. 7 through 10 shows the embodiment of a mold for plastic bottles according to claim 2 of the present invention. The mold 30 forms a cavity for blow molding by being clamped with another mold (not shown).

Figure 7:
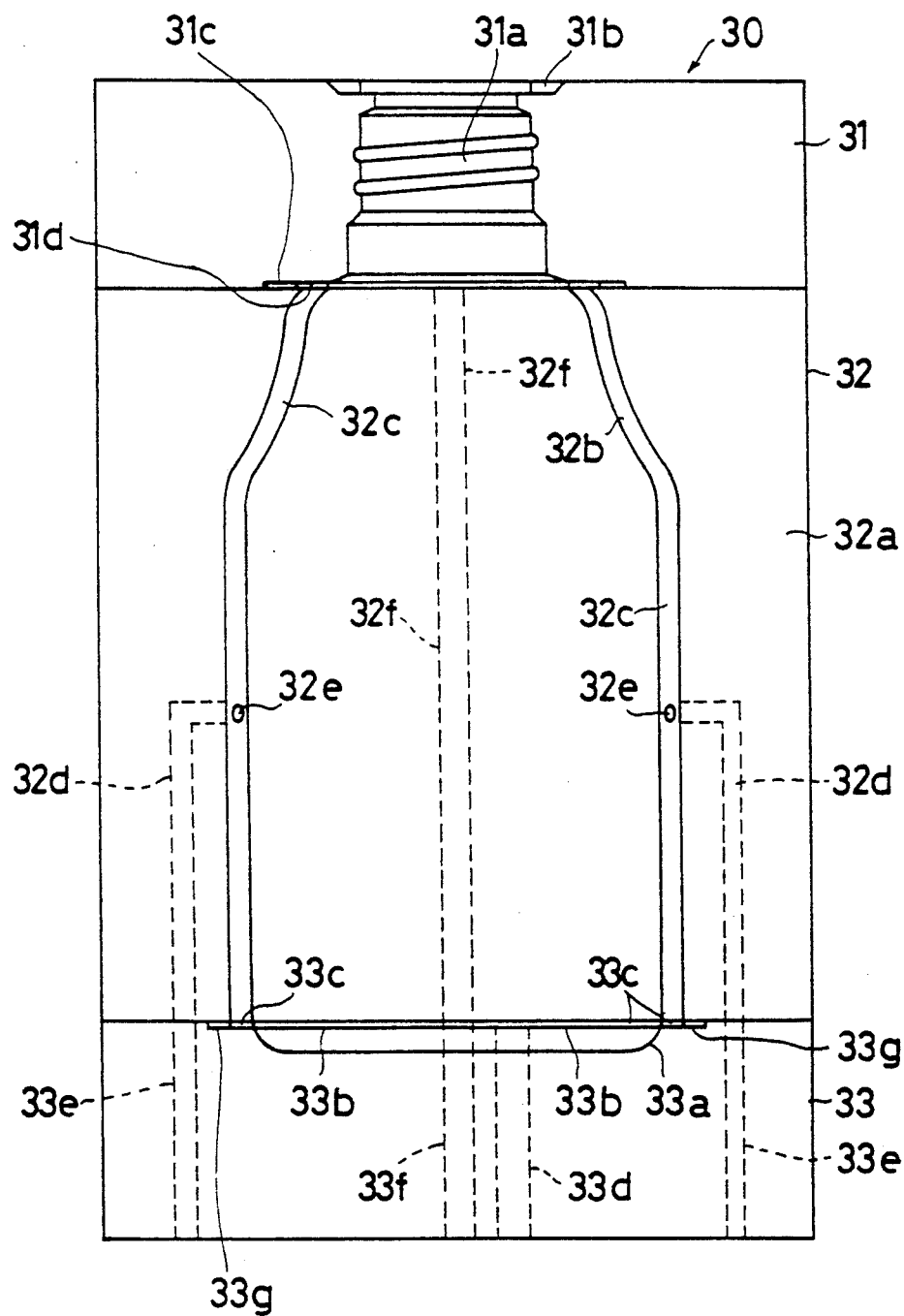
FIG. 7 is a plan view of a mold for plastic bottles according to an embodiment of the present invention.
Figure 8:
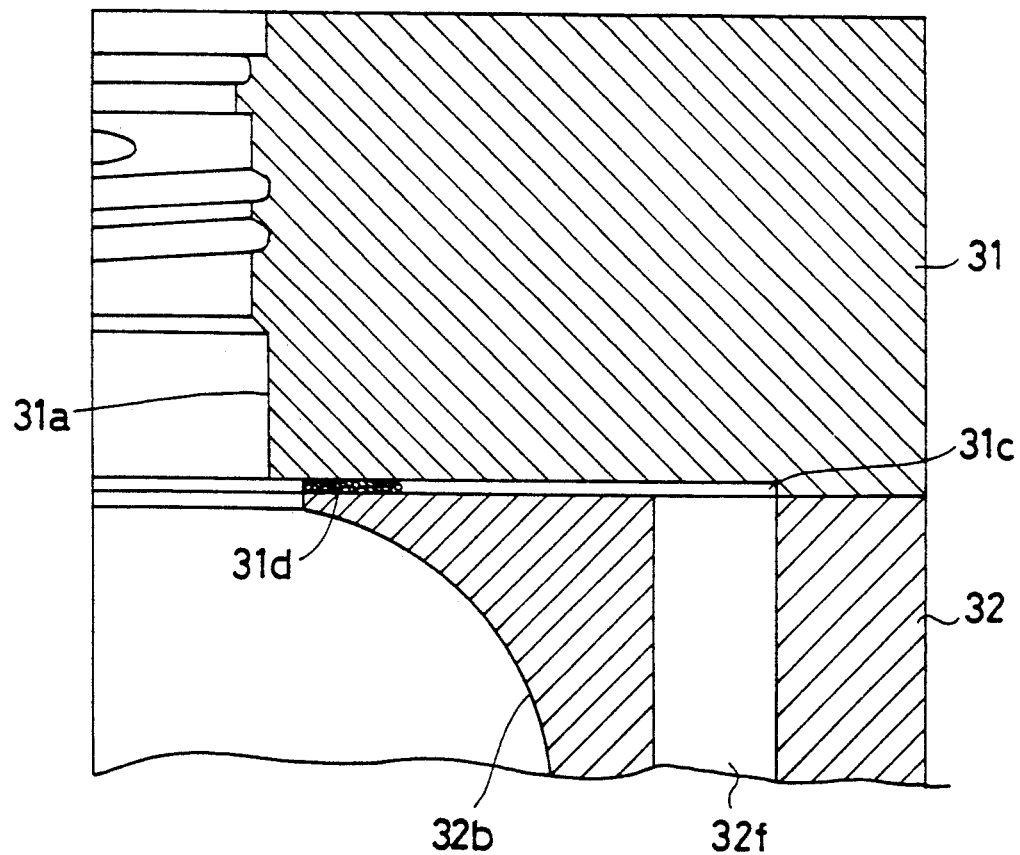
FIG. 8 is an enlarged sectional view showing the constitution of a first air suction passage formed at the boundry between the mouth portion and main body of a bottle of the wall in FIG. 7.
Figure 9:
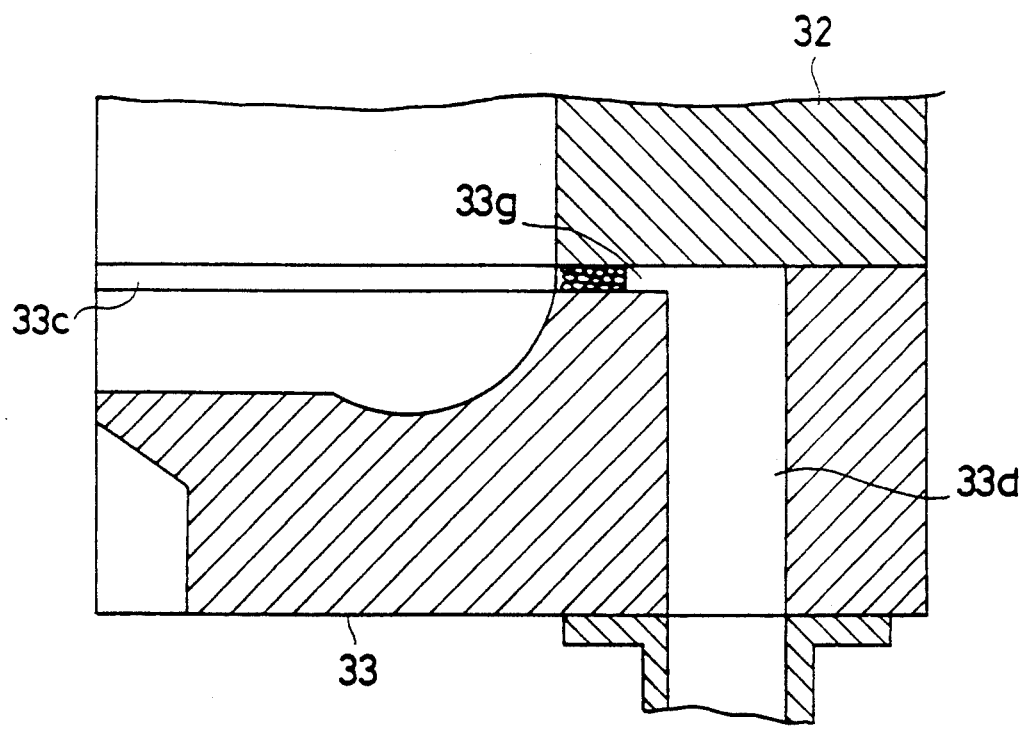
FIG. 9 is an enlarged sectional view showing the constitution of a second air suction passage formed between the main body and the bottom portion of the bottle of the wall in FIG. 7.
Figure 10:
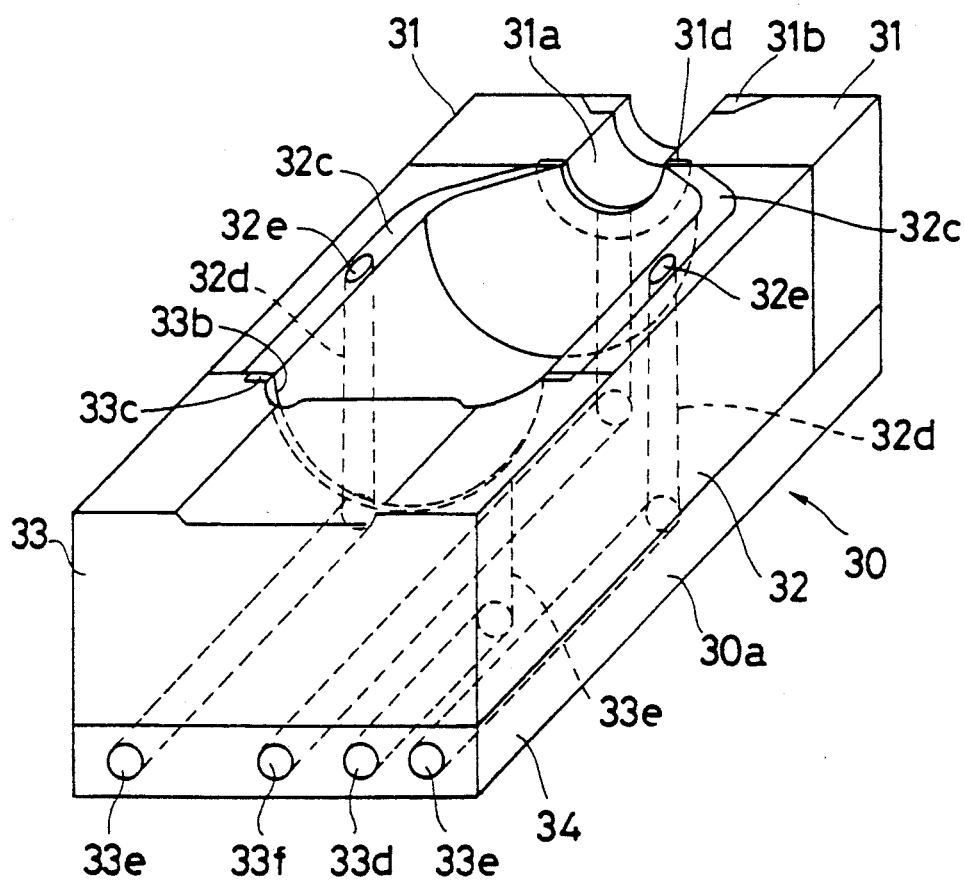
FIG. 10 is a perspective view showing the constitution of the mold in FIG. 7.

The mold 30, called a detachable mold, comprises parts 31, 32, and 33, each of which is, in order as shown in FIG. 7, connected with each other detachably. The part 31 comprises a mouth-forming-wall 31a for forming a mouth portion of a plastic bottle, and thereon is formed a blade 31b for cutting off a softened parison. A first air suction passage 31c is bored through the wall 31a at the boundary between parts 31 and 32. The first air suction passage 31c, which can uniformly absorb the air around the parison, is formed around the mouth-forming-wall 31a. A half-annular cock 31d made of sintered metal is pluged into the air suction passage 31c. Otherwise, in stead of the cock, it is formed in such a clearence as the expanded parison does not intrude thereinto. The width or/and thickness of the air suction passage and the cock is 0.3 mm through 1 mm in case of the existence of the cock, and it is 0.01 mm through 0.10 mm in the absence of the cock. It is such a thickness as not to recognize the traces of the cock 31d visually, unless we see the boundary between the mouth portion and the main body fully staringly. The traces are located at the place covered by the edge portion of the cap of the bottle when it is capped at the mouth portion. Therefore, people can not discover the traces of the cock 31d in the exhibition of the bottle with the cap. The end of the air suction passage 31c is communicated with the air passage 32f formed at the part 32 of the mold.

The part 32 for forming the main body of a plastic bottle is detachably connected with the part 33 so as to make it possible to draw out the molding easily despite the protuberance of the bottom portion of the plastic bottle. A cavity-forming-wall 32b for forming the main body of the bottle is formed under the parting plane 32a of the part 32, and a shallow groove portion 32c for forming a slit for absorbing air from the cavity at clamping the mold 30 is formed at the fringe of the cavity-forming-wall 32b. At the shallow groove portion 32c is formed an air passage 32d, of which end portion is connected with the shallow groove portion 32c, and therein is put a cock made of sintered metal able to transmit air. The other end of the air passage 32d is connected with the joining plane between the parts 32 and 33, and is communicated with the air passage 33e of the part 33. An air passage 32f communicating with the first air suction passage 31c of the part 31 penetrates the part 32.

The part 33 for forming the uplift portion to enhance the intensity by the uplift of the bottom to the bottle comprises a curved bottom-forming-wall 33a for making the angular portion of the bottom round. The bottom-forming-wall 33a corresponds to the boundary portion between the main body of the bottle and the bottom, and thereon is formed a half annular groove 33b as a second air suction passage. The groove portion 33b constitutes the second air suction passage 33g by joining the part 33 to the part 32. A half annular cock 33c made of sintered metal able to transmit air is put on the groove portion 33b. In the absence of the cock 33c, it is also possible to constitute in such a clearence as the expanded parison does not intrude the groove of that width. The circumference of the cock 33c, which communicates with the air passage 33d penetrating the part 33, is a space portion forming a part of the second air suction passage. Air passages 33e, 33f besides the air passage 33d are formed in the part 33. The air passage 33e is connected with the air passage 32f in the part 32, and the air passage 33f with the air passage 32f in the part 32. These air passages 33d, 33s, and 33f are connected with pipes (not shown), through which the air in the cavity is absorbed at the time of forming the cavity by the control of the air amount of the air suction pump.

The same symmetrical shaped mold as the mold 30 is required so as to mold a symmetrical plastic bottle by blowing. Since the constitution of the mold is the same as that of the mold 30 regarding the forming of the cavity and the first and second air suction passages, the description about another mold will be omitted. The numeral 34 designates a bottom plate for fastening the mold 30.

There will be now described the opening and closing operation of the mold 30 and the control of the air suction for a blowing mold.

The mold 30 is first confronted separately by another symmetrical mold so as to form a cavity, and parison is extruded from an extruder to the space between the two molds. When the parison is fully extruded by the predetermined length, extruding is stopped, at the same time the molds are closed to each other for forming a cavity. The air in the cavity is absorbed through the air passages 33*d*, 33*e*, 33*f* by the air suction pump (not shown) in a state of the closure of the molds, and air is blew into the parison between the molds by a blower. The air in the cavity is absorbed through the first air suction passage 31*d*, the air passage 32*d* under the shallow groove portion 32*c*, and the second air suction passage 33*g* by means of the cocks 31*c*, 32*e* and 33*c* made of sintered metal able to transmit air. Therefore the traces of the air stagnation can be greately reduced between the parison and the cavity-forming-walls 31*a*, 32*b*, 33*a*, while the parison is being expanded along the walls 31*a*, 32*b* and 33*a*. During blowing air to the parison, the absorption of the air through the air passages 33*d*, 33*e*, 33*f* lasts. And it is stopped at the same time of the completion of blowing. And accordingly, the outside surface of the parison in the molds has very fewer traces of air stagnation, and high smoothness. After the parison is cooled and hardened, the molds are opened to drop the molding into the storage box under the molds.

What is claimed is:

1. A mold for blow molding a container comprising:

a mold wall surface defining a blow molding cavity formed of two separable mold parts having edges which mate when said mold is closed, clamping means for clamping an extruded parison or a preform by an upper neck portion of said wall surface forming a neck when said mold is closed, at least two slits through said mold wall, each slit being formed by a pair of grooves located at said edges when said mold is closed and said pair of grooves being separated from each other when said mold is open, for communication between air suction means and said cavity when said mold is closed, one of said at least two slits comprising a pair of thin and half ringed grooves in said wall surface at a part of said cavity forming a lower neck portion of a container at a right angle to said parison or preform, another of said at least two slits comprising a pair of thin and half ringed grooves in said wall surface at a part of said cavity forming a lower body portion near the bottom of a container and at a right angle to said parison or preform, and thin sintered material having permeability to air, fixed and fitted in each of said slits, wherein said slits have a width thin enough to prevent said clamped parison or preform from being forced into said slits when said parison or preform is expanded by blowing air into said parison or preform, wherein said mold has a longitudinal axis and said slits are parallel to said longitudinal axis, and wherein said wall surface forming said cavity has an arithmetic average of roughness of less than 0.25 μm.

* * * * *